June 17, 1952  M. W. GUYER  2,600,641
SEED TREATING MACHINE

Filed Nov. 20, 1947  5 Sheets-Sheet 1

Inventor
Morris W. Guyer
By
Smith & Wells
Attorney

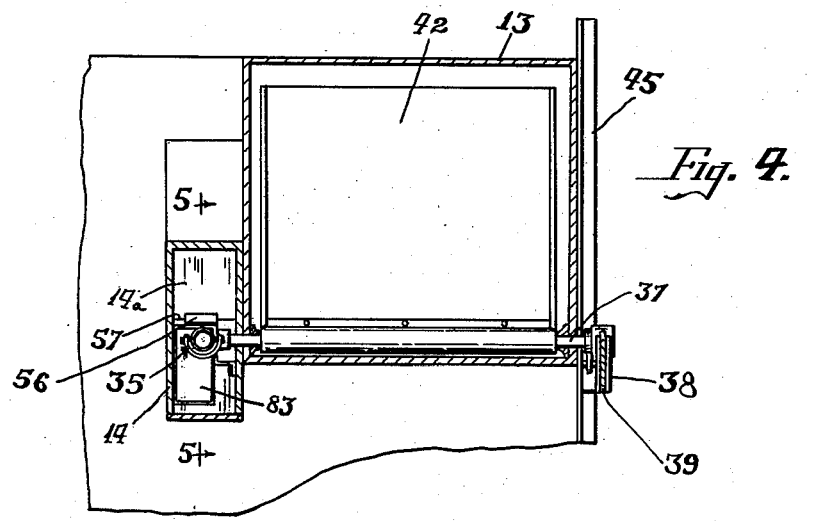
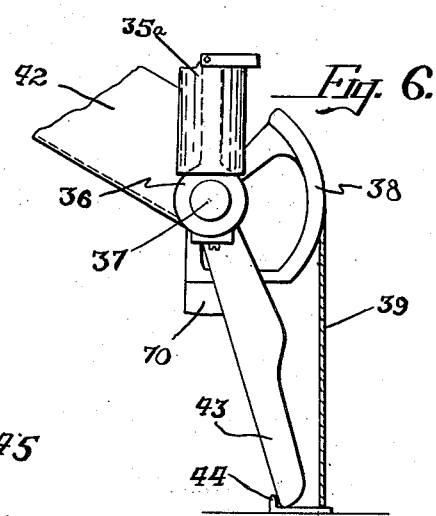
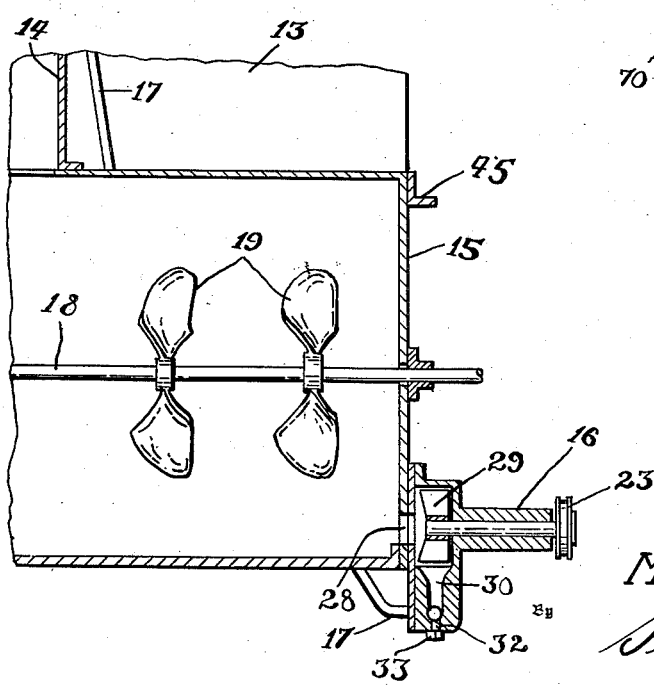

June 17, 1952 M. W. GUYER 2,600,641
SEED TREATING MACHINE
Filed Nov. 20, 1947 5 Sheets-Sheet 3
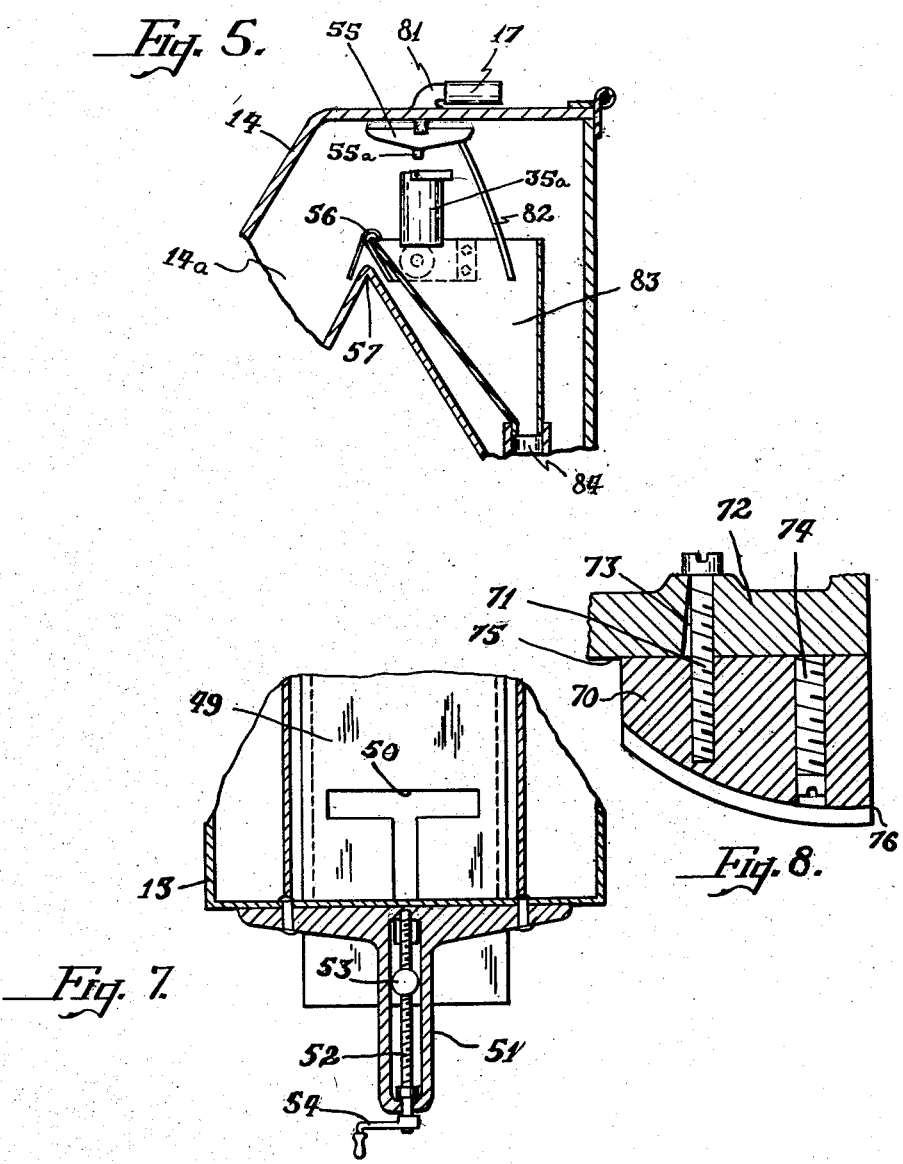

June 17, 1952  M. W. GUYER  2,600,641
SEED TREATING MACHINE
Filed Nov. 20, 1947  5 Sheets-Sheet 4
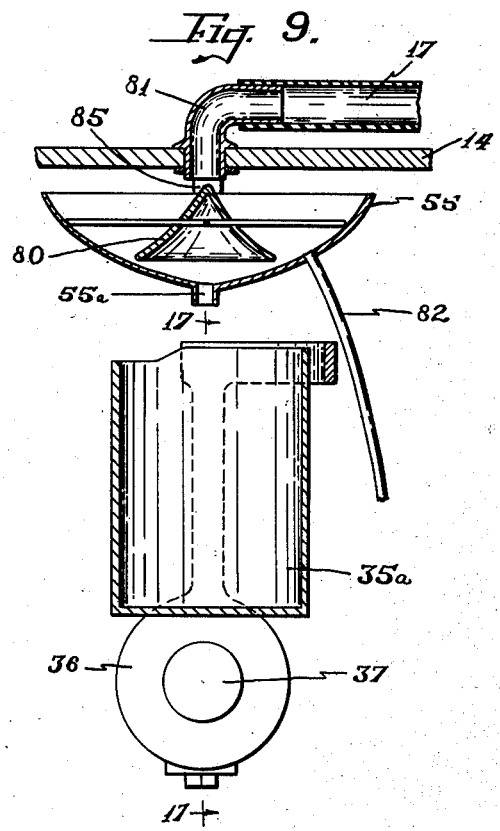
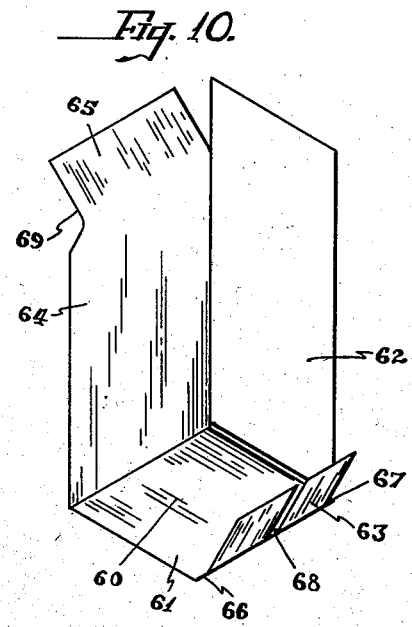
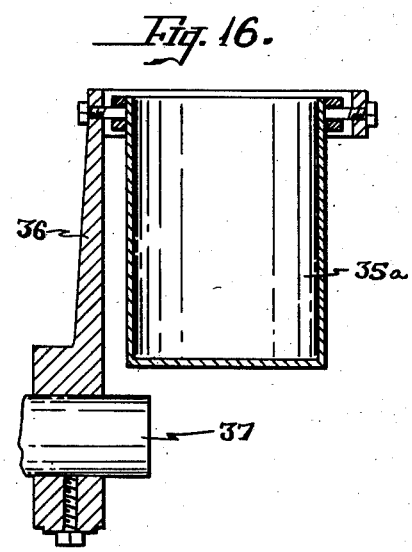
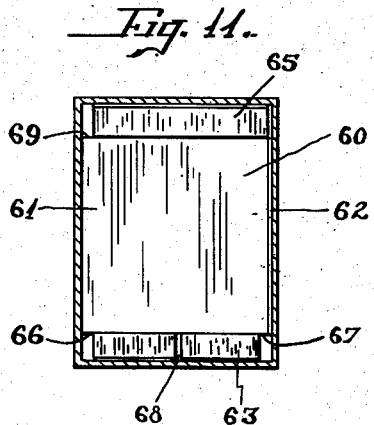
Inventor
*Morris W Guyer*
By
Attorney June 17, 1952     M. W. GUYER     2,600,641
SEED TREATING MACHINE
Filed Nov. 20, 1947     5 Sheets-Sheet 5
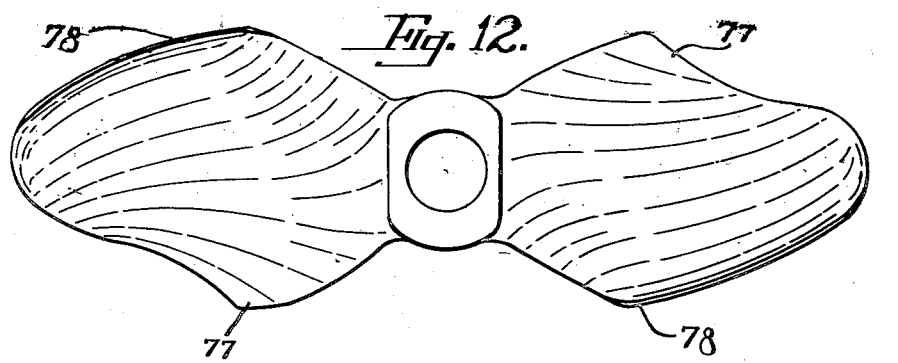
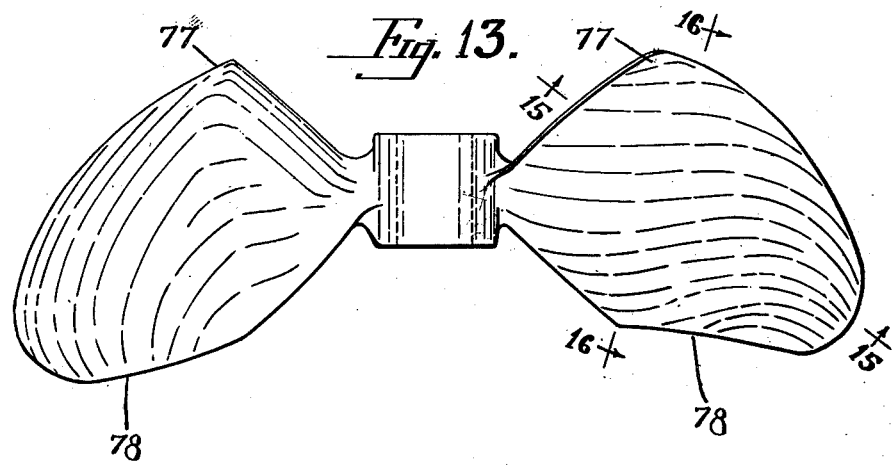
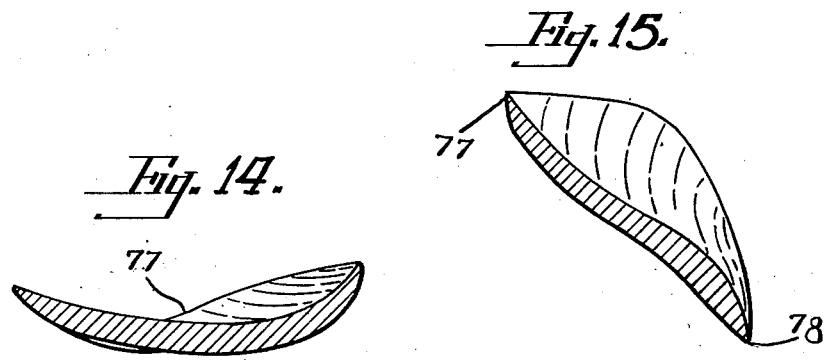
Inventor
Morris W Guyer
By Smith & Wells
Attorney Patented June 17, 1952

2,600,641

UNITED STATES PATENT OFFICE 2,600,641

SEED TREATING MACHINE

Morris W. Guyer, Spokane, Wash., assignor to Calkins Manufacturing Company, Spokane, Wash.

Application November 20, 1947, Serial No. 787,134

9 Claims. (Cl. 222—57)

1

The present invention relates to improvements in a seed treating machine.

In treating such seeds as wheat and the like with various materials for the prevention of disease and the encouragement of growth there are at present two general types of treatment employed. One of these types of treatment utilizes the treating material in a solid or powdered form. The other type of treatment utilizes the material in suspension or solution. Generally the treating material or chemical is in a finely divided solid form but in order to control the distribution thereof on the seeds and in order to cause the material to adhere to the seeds it is mixed in a liquid suspension which may contain spreaders or adhesives to cause the chemical to stick to the seeds. This suspension is usually referred to as a slurry and machines utilizing the liquid suspension of the chemicals are usually referred to as slurry treating machines to distinguish them from the first type of treatment mentioned above.

The difficult problem involved in treatment of the seeds is to obtain uniform distribution of the treating material to the seeds so that in a continuous treating process all of the seed material fed through will be subjected to substantially the same amount of treating material. The slurry is difficult to feed uniformly for the reason that any measuring or delivering device tends to become clogged with the material and the measured amount gradually decreases throughout a period of use. According to the present invention, it is contemplated to provide a machine wherein the seeds are delivered in measured amounts at frequent intervals to a mixing chamber where the treating material is also delivered in amounts proportionate to the amounts of seed fed to the mixing chamber. The details of the mixing chamber are well-known so they are not shown here as they form no part of the present invention. It is the purpose of this invention, however, to provide in combination a seed measuring and delivering mechanism with a slurry measuring and delivering mechanism and means whereby the slurry delivering mechanism is kept clear of accumulation of deposits by continuous washing of the measuring part of the delivery mechanism except during the actual time that a measured amount of slurry is being delivered to the treating chamber.

It is also a purpose of this invention to provide a novel means for keeping the slurry agitated to maintain the treating material in suspension while the slurry is being delivered in small measured amounts to the seed to be treated in the mixing chamber.

2

It is a further purpose of this invention to provide a novel measuring means whereby the slurry is measured and delivered in small quantities by a mechanism actuated by the seed measuring and delivering device.

It is also a purpose of my invention to provide a novel baffle member construction for retarding the flow of the measured slurry to the mixing chamber after it has been measured in order that excessive amounts of the slurry will not be delivered into the mixing chamber at once.

The novel features that I consider characteristic of my invention are set forth with particularity in the claims. The invention itself, however, both as to its organization and its method of operation, together with additional objects and advantages thereof, will be understood from the description of a specific embodiment when read in connection with the accompanying drawings, in which:

Figure 3 is a fragmentary sectional view taken on the line 3—3 of Figure 1;

Figure 4 is a fragmentary sectional view taken on the line 4—4 of Figure 1;

Figure 5 is a sectional view taken on the line 5—5 of Figure 4;

Figure 6 is a somewhat diagrammatic view taken on the line 5—5 of Figure 4, but on an enlarged scale, illustrating the relative position of the parts which cooperate to maintain proper measuring and feeding of the slurry with respect to the seeds being treated;

Figure 7 is a fragmentary sectional view taken on the line 7—7 of Figure 2;

Figure 8 is a fragmentary sectional view through a portion of the weight control mechanism;

Figure 9 is an enlarged sectional view through the measuring mechanism for the slurry;

Figure 10 is a fragmentary perspective view illustrating the baffle member construction used;

Figure 11 is a plan sectional view further illustrating the baffle member construction;

Figure 12 is an enlarged face view of an impeller used for maintaining the liquid suspension of the treating material;

Figure 13 is a plan view of the impeller;

Figure 14 is a sectional view taken on the line 15—15 of Figure 13;

Figure 15 is a sectional view taken on the line 16—16 of Figure 13; and

Figure 16 is a fragmentary sectional view taken at right angles to Figure 9 on the line 17—17 thereof.

Figure 1:
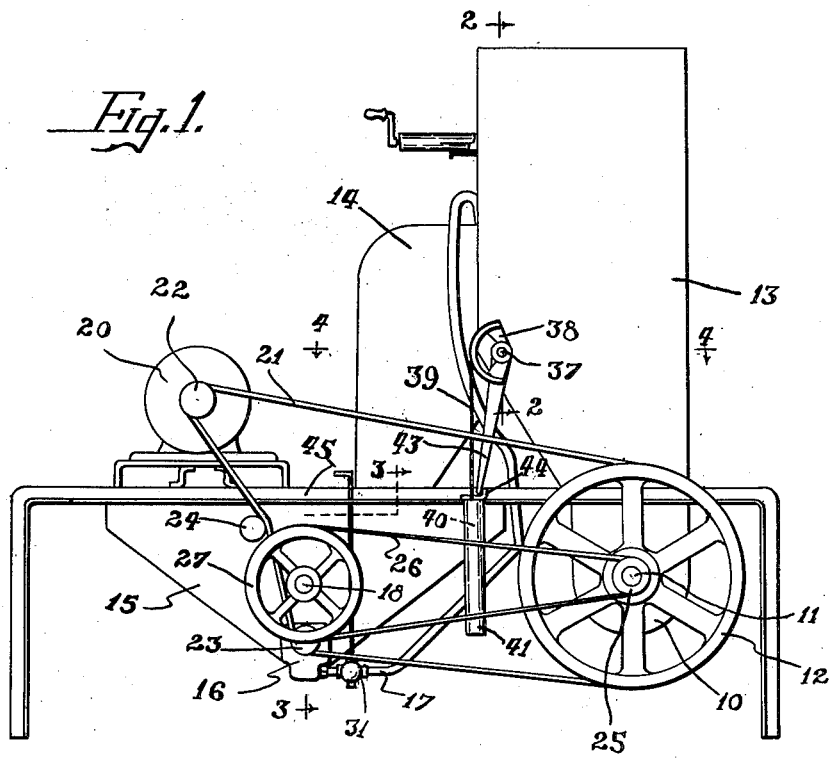
Figure 1 is an end view of a seed treating machine embodying the invention.

Referring now in detail to the drawings my invention is shown as embodied in a machine wherein the mixing chamber is indicated generally at 10 and is provided with a shaft 11 driven by a pulley 12 to supply the necessary power for mixing the seeds with the treating material in the chamber. Over one end of the chamber there is a seed delivery housing 13 which opens down into the mixing chamber and which contains means for delivering measured quantities of seed at intervals to the mixing chamber. Alongside the housing 13 is a slurry delivery housing 14 which contains mechanism coupled with the measuring mechanism in the housing 13 to deliver a measured quantity of slurry into the mixing chamber each time the measured quantity of seed is delivered to the mixing chamber. The slurry used for treating the seed is kept in a slurry tank 15 and delivered to the housing 14 by means of a pump 16 and a pipe 17. The slurry tank contains an agitator shaft 18 on which agitators 19 are mounted for maintaining the proper suspension of the solid materials in the liquid in the tank.

A motor 20 which is mounted on top of the slurry tank is utilized to supply necessary power for operation of the shaft 11, the pump 16 and the shaft 18. A belt 21 extends from a drive pulley 22 on the motor around the pulley 12 and around a pulley 23 for the pump, then over a tightening pulley 24. The shaft 11 has a smaller pulley 25 thereon which is connected by a belt 26 to a large pulley 27 on the shaft 18. The drive mechanism just described drives the mixing shaft 11 at a speed which is stepped down considerably from the speed in the motor. Owing to the small size of the pulley 23 the pump 16, however, is driven at a relatively higher speed approximating that of a motor. The shaft 18 is driven at a very low speed since it is unnecessary to agitate the slurry at a very rapid rate. With some treating materials foaming results where the agitation is rapid in the presence of air. This is avoided by the construction of the present drive mechanism. The pump is a centrifugal type pump, but, owing to the fact that air is substantially excluded from it, no foaming results due to the high speed of the pump impeller.

As best shown by Figure 3, the slurry tank 15 has an outlet 28 leading to the pump impeller 29 which discharges downwardly through an outlet 30 to the conduit 17. The conduit 17 has a three-way valve 31 therein so that it can be drained free of slurry at the end of a particular seed treating operation. A handle is provided for the valve. Draining of the conduit 17 is necessary. If this is not done the conduit becomes packed with slurry so the pump cannot force the material through the conduit. A drain outlet 32 is provided for the pump and is normally closed by a plug 33. The conduit 17 leads upwardly to the treating material housing 14, as shown in Figure 5 of the drawings, where it discharges into a measuring device 35. The measuring device includes a cup 35a which is pivoted to an arm 36 that is fixed on a rock shaft 37. This shaft 37 extends horizontally through the wall of the housing 14 into the housing 13 and through this housing where it also mounts a quadrant 38 to which a cable 39 is secured, the cable being secured to a weight 40 within a casing 41. The shaft serves to mount a seed pan 42 within the housing 13 and the seed pan is adapted to drop down when sufficient seed has poured thereon to overcome the weight 40. Downward movement of the weight 40 is limited by an arm 43 on the shaft 37 just inside the quadrant 38. The arm 43 engages a stop 44 which is mounted on an angle iron 45 that forms part of the supporting frame for the machine.

Figure 2:
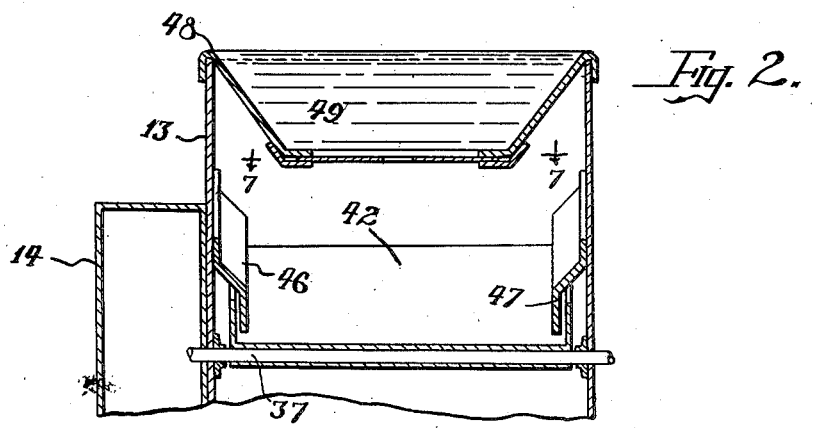
Figure 2 is a fragmentary sectional view taken on the line 2—2 of Figure 1.

Within the housing 13 shields 46 and 47 are provided to prevent the seed from dropping over the side edges of the pan 42. The housing 13 has a hopper 48 set on top thereof which hopper is closed at the bottom by an adjustable plate 49 for controlling the rate of flow of the seed to the pan 42. The plate 49, as shown best by Figure 7, has a T-slot 50 therein and, by adjusting the plate into and out of the opening of the bottom of the hopper, the control of the seed can be regulated fairly closely. The plate 49 is long enough to prevent its inner edge from disengaging with the hopper at any time. The plate is operated by providing on the exterior of the housing 13 a bracket 51 which has a threaded stem 52 rotatably mounted therein. This stem is threaded through a post 53 that is secured on the plate 49. A handle 54 is provided for the stem 52. The hopper 48 has the three sides shown in Figure 2 sloped with the fourth side, not shown, extending down substantially parallel with the housing 13.

The pan 42 is bent around the shaft 37 and secured thereto. This shaft is placed sufficiently close to the wall of the housing 13 to prevent grain from falling back of the pan. In operation the grain is fed to the hopper 48 at a rate sufficient to keep it flowing steadily through the slot in the plate 49. The grain piles up on the pan 42 until it overcomes the weight 40. When this occurs the pan 42 will drop and rock the shaft 37 through an angle of at least 90 degrees. The seed on the pan 42 will drop down into the mixing chamber 10 and the weight 40 will then return the pan 42 to its filling position. In this fashion the seed is accurately measured and delivered to the mixing chamber. The plate 49 with its T-slot is particularly advantageous in connection with the feeding of seed at varying rates. When a high rate of feeding is employed the T-slot will be farthest out on the pan from the shaft 37 so that the force of the seed falling will tend to make the pan dump more quickly to thus compensate for the amount that flows through the slot during the period that the pan is lowered for dumping.

The cup 35a (shown best by Figures 5, 6 and 10) is so mounted that while the pan 42 is in raised position the cup is directly beneath the outlet 55a of a pan 55 into which the conduit 17 empties, so that it is being washed continuously by the liquid suspension of treating material delivered by the pump 16. The pump has a capacity sufficient to deliver at least three or four times the amount of liquid necessary to fill the cup 35a in the length of time that the pan 42 is in raised position. As soon as the shaft 37 starts to turn, the arm 36 moves the cup 35a laterally until the cup is clear of the stream of material from the outlet 55a. The cup then strikes a stop 56 and is gradually tipped from the upright position shown in Figure 5 so as to empty its contents over the stop 56 and over the edge 57 of the housing 14 into the portion 14a of the housing that leads to the mixing chamber. In this way the treating material filling the cup 35a is emptied once for each dumping action of the pan 42.

The pan 55 has a cone-shaped spreader 80 in it just beneath the outlet nipple 81 that is provided for connecting the conduit 17 to the housing 14. The pan 55 also has an overflow outlet 82 that empties into a funnel 83 that has its outlet pipe 84 extending into the slurry tank. The funnel is so located beneath the cup 35a that the overflow from the cup also runs down into the funnel. The stop 56 is a sheet metal member that is bolted to one side wall of the housing 14. The funnel 83 is bolted to the opposite side wall of the housing 14. The pan 55 has ears 85 suspending it from the top wall of the housing 14.

Below the edge 57 of the housing 14 in the portion 14a of the housing I provide a baffle member 60. This baffle member is shown best in Figures 11 and 12 and consists of a piece of sheet metal bent as shown to provide a bottom portion 61 that extends across the housing part 14a. A side portion 62 of the baffle member fits flat against one side of the housing and an angularly disposed wall 63 extends upwardly from the bottom and laterally to an adjacent wall of the housing. Opposite the portion 63 there is an elongated wall 64 on the baffle member which is bent outwardly at 65 to engage the wall of the housing opposite that engaged by the portion 63 of the baffle member. The side edges of the wall 64 and the bottom 61 directly engage the fourth wall of the housing. It will be noted from Figures 11 and 12 that the portion 63 of the baffle member is shortened with respect to the bottom portion at 66 and 67 to provide slots through which the treating material may escape. In addition, there is a middle slot 68 in the portion 63 for the material to drain through. The portion 65 of the wall 64 is also offset at 69 so as to leave a narrow space between it and the fourth wall of the housing. The advantage of this construction lies in the fact that it slows down the discharge of the treating material into the mixing chamber and prevents the treating material from being delivered in a mass which would wet the seed too much and require a great deal of mixing in order to transfer the moisture and treating material to other seed. The moisture content of the seed must be kept very low to avoid injury in case the seed is stored. The amount of treating material per pound of seed is very slight. These two factors make it necessary to have as great a distribution of the treating material as possible when it first strikes the seed in the mixing chamber. With the combination of the cup and the baffle member and a pump delivering an excess of treating material to the cup the results have proven quite satisfactory in delivering the treating material to the mixing chamber.

Referring now to Figures 6 and 8, these figures illustrate in detail the construction of the quadrant 38 by which the weight 40 can be varied in effect in order to change the dumping action of the pan 42. The quadrant 38 has a removable section 70 which is positioned at the end of the quadrant where the cable 39 engages when the pan 42 is lowered for dumping. This removable section 70 is attached by a screw 71 that extends through a web 72 of the quadrant into the portion 70. There is sufficient space around the screw 71 in the web 72, indicated at 73, to permit some rocking of the portion 70 with respect to the web. A screw 74 is threaded into the portion 70 so that it can be adjusted against the radius from the center of the shaft 37 to the outer corner 76 of the removable portion 70. When the pan is down in dump position it will be returned more easily if this radius is increased.

Referring now to Figures 12, 13, 14 and 15, these figures illustrate in detail the agitators 19 which are utilized to maintain the treating material in suspension. Many of these treating materials are so inclined to foam that it is very difficult to prevent foaming in the slurry tank and yet maintain enough agitation to keep the treating material in suspension. The agitator 19 is so designed that its leading edge 77 as it moves downwardly into the liquid, is substantially a point, with the edge running toward the shaft from the point substantially straight, but oblique with respect to the axis, so as to push the liquid outwardly. The outer portion of the leading edge recedes sharply. The curvature of the front face is forward to the tip of the blade to give axial direction to the liquid with respect to the shaft. The receding edge 78 of the blade is straight for a substantial distance out from the hub and then curves in conformity to the outer front face of the blade. The front face of the blade between the straight leading and receding edges has a slight bulge forward from the hub end of the leading edge to the point of the straight part of the receding edge. The rear face of the blade is convexly curved from the leading edges to the trailing edges, being flattened at the center of the blade. This construction is particularly effective, at the relatively slow speed of rotation of the blades, in maintaining the slurry in continuous swirling movement without splashing it. Since the slurry, with many treating materials, foams readily, this is important.

From the foregoing description it is believed that the nature and advantages of the present invention will be clear to those skilled in the art. Having thus described my invention, I claim:

1. A seed treating machine of the character described comprising in combination a mixing chamber, a seed delivery housing opening into the mixing chamber, a slurry delivery housing, a slurry tank, a seed dump pan pivoted in the seed delivery housing, a slurry measuring and delivery cup in the slurry delivery housing connected with said dump pan to move in unison therewith, a pump having an inlet connected to the slurry tank, and a conduit leading from the pump into the slurry delivery housing to supply slurry from said tank to the cup in excess of the cup capacity during the interval when the cup and dump pan are in loading position, and said slurry delivery housing having a portion beneath the cup directing overflow from the cup to the slurry tank while it is in loading position, and said slurry delivery housing having a portion positioned beneath the dump position of said cup to direct the slurry therefrom into the mixing chamber.

2. A seed treating machine of the character described comprising in combination a mixing chamber, a seed delivery housing opening into the mixing chamber, a slurry delivery housing, a slurry tank, a seed dump pan pivoted in the seed delivery housing, a slurry measuring and delivery cup in the slurry delivery housing connected with said dump pan to move in unison therewith, a pump having an inlet connected to the slurry tank, and a conduit leading from the pump into the slurry delivery housing to supply slurry from said tank to the cup in excess of the cup capacity during the interval when the cup and dump pan are in loading position, and said slurry delivery housing having a portion beneath the cup directing overflow from the cup to the slurry tank while it is in loading position, and said slurry delivery housing having an outlet to the mixing chamber and a baffle member over the outlet, the cup having a spout thereon for directing the slurry in the cup to said baffle member when the cup is moved to dump position.

3. In a machine of the character described, a slurry tank, a seed delivery and measuring device, a slurry measuring cup, a mixing chamber into which the seeds are delivered from the seed measuring and delivery device, means operable by the seed measuring and delivery device periodically emptying the contents of said cup into the mixing chamber, means connected with the tank for discharging the slurry downwardly into said cup whereby to fill and flush the cup in the intervals between its periodic emptying, said emptying means comprising a rock shaft, actuated upon each delivery of a predetermined weight of seed to the mixing chamber, an arm on the shaft supporting said cup, and a slurry delivery passage leading from the cup to the mixing chamber.

4. In a machine of the character described, a slurry tank, a seed delivery and measuring device, a slurry measuring cup, a mixing chamber into which the seeds are delivered from the seed measuring and delivery device, means operable by the seed measuring and delivery device periodically emptying the contents of said cup into the mixing chamber, a drain passage beneath the cup leading to the slurry tank for returning overflow slurry from the cup to the slurry tank, a pump having its inlet connected to the slurry tank, a conduit leading from the pump and discharging the slurry downwardly into said cup whereby to fill and flush the cup in the intervals between its periodic emptying, said emptying means comprising a rock shaft, actuated upon each delivery of a predetermined weight of seed to the mixing chamber, an arm on the shaft supporting said cup, and a slurry delivery passage leading from the cup to the mixing chamber.

5. In a machine of the character described means to supply a stream of slurry, a slurry measuring cup, means mounting the cup in upright position in the path of said stream for filling the cup and operable to move the cup laterally while filled and while upright out of the path of said stream, and means, cooperating with said mounting means, to tip and empty the cup while it is out of the path of the stream.

6. In a machine of the character described, a measuring device operable to measure seed to be supplied with slurry, means to supply a stream of slurry, a slurry measuring cup, means mounting the cup in upright position in the path of said stream for filling the cup and operable by the seed measuring device to move the cup laterally while filled and while upright out of the path of said stream, and means, cooperating with said mounting means, to tip and empty the cup while it is out of the path of the stream.

7. In a seed treating machine, a rock shaft, seed supply means operable to rock said shaft intermittently, an arm on said shaft, a slurry measuring cup pivotally suspended from said arm, and means engaging the cup as the rock shaft moves toward the limit of its rocking movement in one direction operable to tip the cup on its pivot and thereby empty the cup.

8. In a machine of the character described, slurry measuring and supplying means comprising a slurry measuring cup, a source of slurry operable to pour slurry into said cup in one position of the cup, a rock shaft having an arm on which the cup is pivotally suspended so that upon rocking of the shaft the cup is moved into and out of the path of the poured slurry, and a tipping member spaced laterally from the path of the poured slurry engaged by the cup when it is moved by said shaft away from the path of the poured slurry whereby to tip the cup and empty it.

9. In a machine of the character described, slurry measuring and supplying means comprising a slurry measuring cup, a source of slurry operable to pour slurry into said cup in one position of the cup, means pivotally suspending said cup and movable to and fro to position the cup alternately in the path of the poured slurry and to one side of the path, and means engaging the cup only when it is out of the path of the poured slurry for tipping the cup on its pivotal support and thereby emptying it.

MORRIS W. GUYER.

REFERENCES CITED

The following references are of record in the file of this patent:

UNITED STATES PATENTS

| Number | Name | Date |
|---|---|---|
| 989,942 | Bain | Apr. 18, 1911 |
| 1,658,460 | Nichols | Feb. 7, 1928 |
| 2,026,499 | Hurst et al. | Dec. 31, 1935 |
| 2,120,437 | Feese | June 14, 1938 |
| 2,174,729 | Schlack | Oct. 3, 1939 |
| 2,195,511 | Craddock | Apr. 2, 1940 |

FOREIGN PATENTS

| Number | Country | Date |
|---|---|---|
| 551,084 | Great Britain | 1943 |